Sept. 21, 1926.
A. SORLIEN
1,600,604
BOARD HOLDER FOR SAWING MACHINES
Filed March 6, 1926
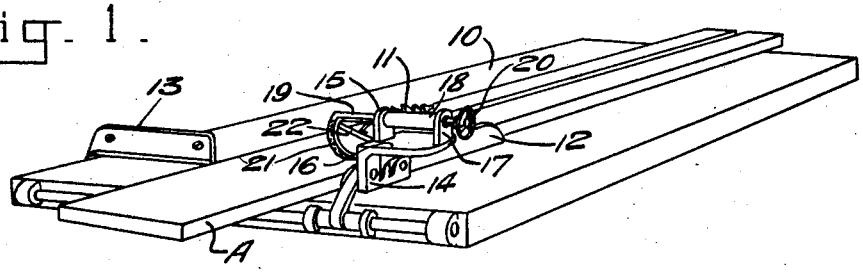
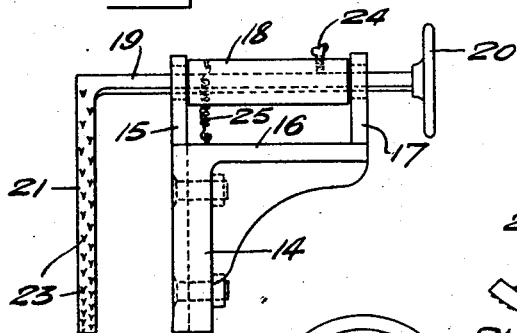
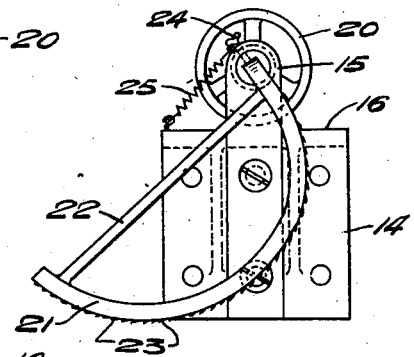
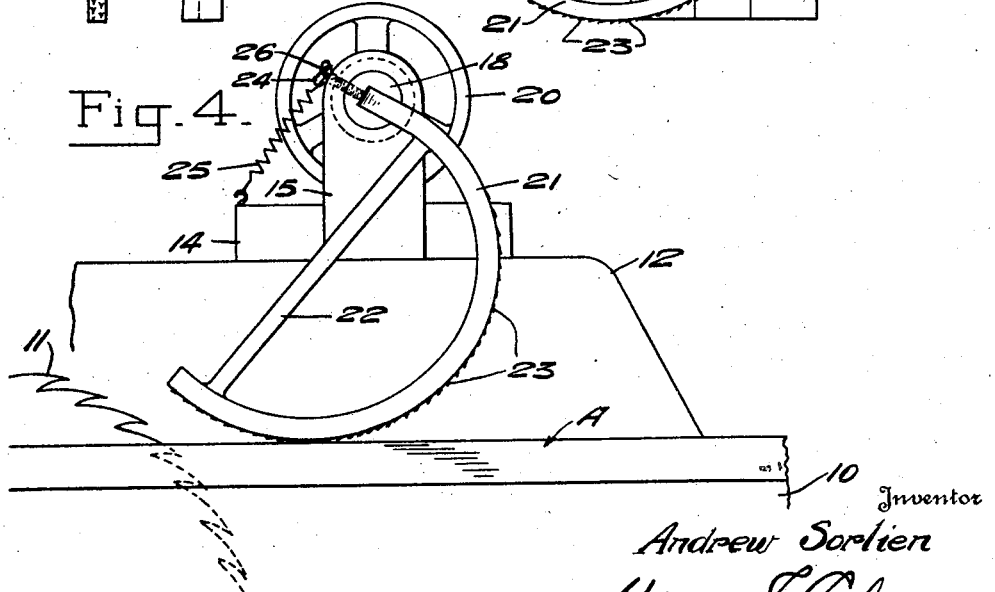
Inventor
Andrew Sorlien
By Watson E. Coleman.
Attorney Patented Sept. 21, 1926.

1,600,604

UNITED STATES PATENT OFFICE.

ANDREW SORLIEN, OF AUSTIN, MINNESOTA.

BOARD HOLDER FOR SAWING MACHINES.

Application filed March 6, 1926. Serial No. 92,841.

This invention relates to means for holding boards down upon the table of a circular sawing machine and preventing the boards from being kicked back by the rip saw.

The general object of the invention is to provide a device of this character which may be easily applied to the ordinary saw gauge or guide mounted upon the saw table, and which is adjustable toward or from the saw so that it may be disposed over any desired part of the board being ripped.

A further object is to provide a device of this character which is very simple, which may be easily applied and which may be readily adjusted either while the saw is in operation or at any other time.

My invention is illustrated in the accompanying drawings wherein:—

Figure 1 is a perspective view of a saw table having my board holding guard applied thereto;

Figure 2 is a side elevation of the guard;

Figure 3 is a front elevation thereof;

Figure 4 shows the guard in applied position.

Referring to these drawings it will be seen that I have illustrated an ordinary saw table 10 having the circular saw 11 which may be, for instance, a rip saw, and having the longitudinally extending guide 12 which is disposed parallel to the saw, a second guide 13 being disposed at right angles to the saw.

My device comprises a bracket 14 having apertures through which bolts or screws may be passed to hold it to the guard 12, this bracket being recessed upon one face to receive the upwardly extending bearing member 15 which is held to the bracket by screws, bolts or in any other suitable manner. The bracket supports the upper plate 16 to which is attached the other bearing member 17. Between these bearing members 15 and 17 there is disposed the rotatable sleeve 18 having a many sided passage through it and extending through this passage is a many sided shaft 19 carrying at one end a wheel or handle 20. The opposite end of the shaft extends over the saw table and adjacent the saw 11, is bent to form an eccentric 21, this eccentrically bent portion 21 being braced by a brace 22. The face of the eccentric 21 is serrated or formed with prongs 23 which will engage with the board. A set screw 24 passes through the sleeve and engages the square shaft and normally prevents longitudinal movement of the shaft. When the set screw is released, however, the set screw may be adjusted to carry the eccentric toward or from the saw 11. Preferably a spring 25 is engaged at one end with the face plate 16 and at the other end with a hook 26 projecting from the sleeve, this spring acting to urge the eccentric down against the board A.

In the use of the device the bracket is bolted to the guide 12, as hereinbefore described, the board is inserted in the direction of the arrow, lifting up the eccentric so that the board may be fed freely toward the saw. If any reverse movement of the board occurs, that is if the board is kicked back by the action of the rip saw, the eccentric will immediately wedge against the board, holding it tight down upon the saw table and preventing any reverse movement. It will be seen that this eccentric holding device may be readily adjusted toward or from the saw as desired and adjusted at any desired portion of the board. It is readily adjusted even while the saw is in operation by simply releasing the set screw, shifting the shaft 19 and again setting the set screw. The device is very simple, can be cheaply made and is readily applied to ordinary saw tables having a longitudinally extending guide or gauge.

I claim:—

1. A board holding device for circular sawing machines comprising a supporting bracket adapted to be attached to the saw table and having bearings, a rotatable sleeve disposed between the bearings, a shaft extending through the sleeve and rotatable therewith, the shaft being longer than the distance between the bearings to thereby permit the shaft to be longitudinally adjusted therethrough, the shaft having a handle on one end and at its opposite end being formed to provide a board engaging eccentric.

2. In a sawing machine, a circular saw, a saw guide extending parallel thereto, bearings carried by the saw guide, a rotatable sleeve disposed between the bearings and having a many sided passage therethrough, a many sided shaft extending through the passage and longitudinally adjustable through the sleeve and bearings, carrying at one end a handle and at its other end formed to provide a board engaging eccentric, and means for clamping the shaft to said sleeve in any adjusted position of the shaft.

3. A board holding device for circular sawing machines including a supporting bracket having upwardly extending bearing members, a rotatable sleeve disposed between the bearing members and having a many sided passage therethrough, a many sided shaft extending through the sleeve and longitudinally adjusted therethrough, and through the bearings, said shaft at one end being bent to form a board engaging eccentric and having a toothed face, the passage end of the shaft beyond the adjacent bearing being provided with a handle, a set screw passing through the sleeve and engaging the shaft to hold it in longitudinally adjusted position, and a spring acting to urge the shaft in a direction to force the eccentric against a board.

In testimony whereof I hereunto affix my signature.

ANDREW SORLIEN.